(12) United States Patent
Mayer et al.

(10) Patent No.: US 9,011,617 B2
(45) Date of Patent: Apr. 21, 2015

(54) METHOD FOR MANUFACTURING A MULTI-LAYER COMPOSITE, ARRANGEMENT FOR POSITIONING A SHEET-LIKE ELEMENT ONTO A BACKING IN A LAMINATING UNIT

(75) Inventors: Thomas Mayer, Biberist (CH); Alex Mann, Bibern (CH); Michel Siegenthaler, Moutier (CH); Philippe Guglielmetti, Satigny (CH)

(73) Assignee: Asitrade AG (CH)

( * ) Notice: Subject to any disclaimer, the term of this patent is extended or adjusted under 35 U.S.C. 154(b) by 498 days.

(21) Appl. No.: 12/897,121

(22) Filed: Oct. 4, 2010

(65) Prior Publication Data
US 2011/0079340 A1 Apr. 7, 2011

(30) Foreign Application Priority Data

Oct. 2, 2009 (EP) .................................... 09012502

(51) Int. Cl.
*B32B 41/00* (2006.01)
*B32B 38/18* (2006.01)

(52) U.S. Cl.
CPC ............. *B32B 38/1833* (2013.01); *B32B 41/00* (2013.01); *B32B 2041/04* (2013.01); *B32B 2317/12* (2013.01)

(58) Field of Classification Search
CPC .. B32B 37/226; B32B 2309/72; B32B 41/00; B32B 37/142; B65H 2513/10; B65H 2220/01; B65H 2701/1311; B65H 9/002

USPC ........... 156/64, 350, 351, 360, 362, 363, 364, 156/378, 379
See application file for complete search history.

(56) References Cited

U.S. PATENT DOCUMENTS 6,570,354 B1 * 5/2003 Dobbertin et al. ............ 318/560
7,530,256 B2 * 5/2009 deJong et al. .................. 73/1.37

FOREIGN PATENT DOCUMENTS

EP 0733467 9/1996
FR 2857655 1/2005

OTHER PUBLICATIONS

English translation of FR2857655 obtained from the European Patent Office web page.*

* cited by examiner

*Primary Examiner* — Michael N Orlando
*Assistant Examiner* — Joshel Rivera
(74) *Attorney, Agent, or Firm* — Ostrolenk Faber LLP

(57) ABSTRACT

A method and an arrangement for manufacturing a multi-layer composite (13) by laminating a sheet-like element (6) onto a backing (2) in a laminating unit (1), having steps, in this order, of conveying the element (6) in a longitudinal direction, detecting a position of the element (6), correcting the position of the element (6) on the basis of the detected position and on the basis of a reference position (15), and bonding said element (6) onto the backing (2). The detection step comprises the phases of measuring the lateral position, an angle of pivoting, and a longitudinal position of the element (6), and the correction step includes phases of lateral movement (T), pivoting (P), and longitudinal movement (L) of the element (6), apparatus elements perform the steps.

12 Claims, 2 Drawing Sheets

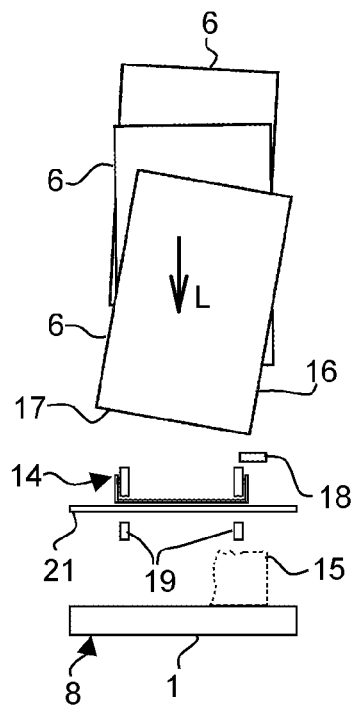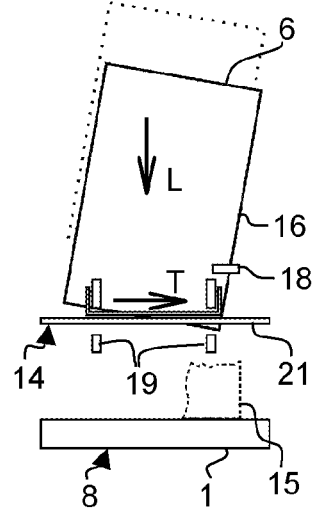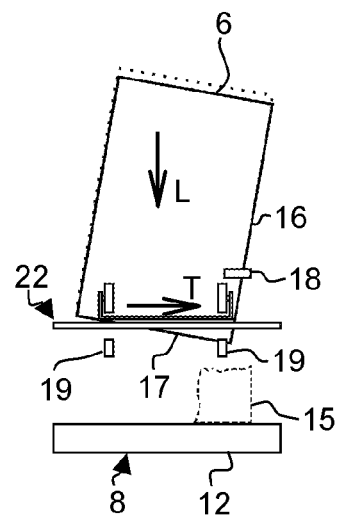
Fig. 2　　　Fig. 3　　　Fig. 4
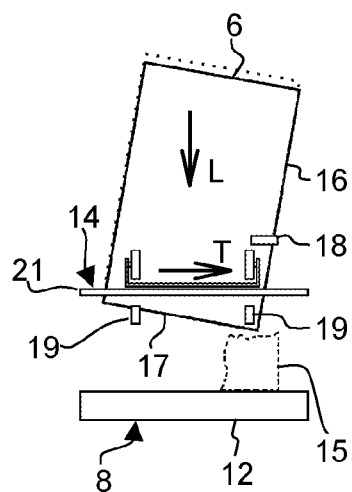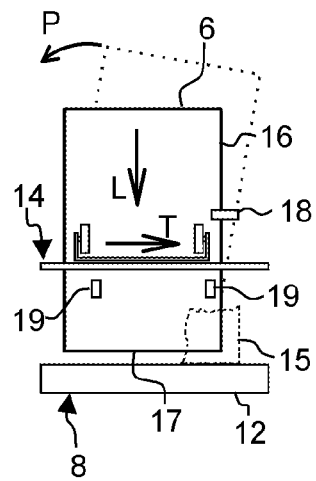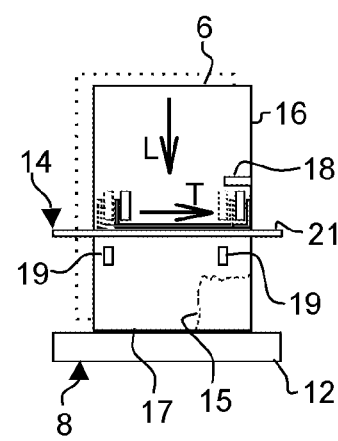
Fig. 5　　　Fig. 6　　　Fig. 7

METHOD FOR MANUFACTURING A MULTI-LAYER COMPOSITE, ARRANGEMENT FOR POSITIONING A SHEET-LIKE ELEMENT ONTO A BACKING IN A LAMINATING UNIT

BACKGROUND OF THE INVENTION

The present invention relates to a method for manufacturing a multi-layer composite by laminating a sheet-like element onto a backing in a laminating unit. The invention also relates to an arrangement for positioning a sheet-like element onto a backing, to manufacture a multi-layer composite in a laminating unit. The invention relates to a laminating unit for manufacturing a multi-layer composite embodying such a method and comprising such a positioning arrangement.

Multi-layer composite materials are used in the field of packaging, after they have been cut, folded and glued. One of these composites commonly used is corrugated board. It is used mainly as a protective packaging that is particularly strong while being readily recyclable.

Corrugated board is for example made up of an inner board provided with corrugations, bonded onto a first flat coverboard on one side of the corrugations. This inner board with first flat coverboard constitutes a single-face corrugated board. The single-face corrugated board obtained is also assembled by bonding with a second flat board on the other side of the corrugations.

To make the packaging more attractive, the corrugated board is often printed. This operation is performed by flexography in order to obtain quality prints in multiple colors. However, printed corrugated board may exhibit defects, for example in the case of relatively thin corrugated board. The defects are not acceptable for packaging for expensive products.

Some printing defects among others are lines corresponding to each crest of the corrugations because, during printing, the corrugated board will be crushed slightly. The difference in strength between the tops of the corrugations and the regions separating two consecutive corrugations is the main reason why these lines appear during the printing operation.

One technique then is to use laminating to assemble a sheet-like element in the form of a preprinted sheet of board, onto a backing in the form of a single-face corrugated board.

The sheet-like element is for example paper sheet, cardboard sheet, corrugated cardboard sheet or flexible plastic sheet, which is rough or printed, etc. The sheet-like element is already printed using flexography, photogravure or offset printing or converted using embossing, calendering or metallization by hot foil stamping, etc. The backing is for example paper board, cardboard, single-face corrugated board, double-face corrugated board or foam, etc.

To do this, a laminating unit comprises a section for feeding the sheet-like elements, the sheet-like elements being shingled, and a section for laminating the sheet-like elements onto the backings.

If the backings are in the form of boards, the laminating unit comprises also a section for feeding the backings. If the backing is in the form of a web, the laminating unit comprises also a section for cutting this web. The web comes from a reel or is produced in line upstream of the laminating unit.

In the laminating section, the sheet-like element is bonded by pressing between two rolls onto the backing that has previously been coated with glue.

In order to obtain a quality composite, the positioning of the sheet-like elements in the laminating section is an operation of key importance. The sheet-like element has to be positioned accurately so that later conversions are perfectly in register with the edges, printings, and/or conversions of the composite obtained.

PRIOR ART

Traditionally, alignment is performed by first of all bringing the sheet-like element against frontal end stops then against a lateral end stop, using a translational-drive member.

This approach inevitably leads to damage to the frontal and lateral edge at the end stops and therefore to a loss of quality. In addition, this alignment operation is performed in two stages, which entails temporarily halting the sheet-like element and therefore a reduction in production rates.

Document EP-0,733,467 describes a method and a device for laminating separate topsheets onto a web of single-face corrugated board in a laminating machine in order to form double-sided corrugated sheets. The method comprises a first step in which the topsheets are fed from a stack and directed toward a laminating roll positioned downstream. In a second step, the single-face web is fed in and cut to length by a blade. In a third step, each topsheet is guided over a variable-speed positioning roll. In a fourth step, the speed of the positioning roll is adjusted in order to establish a desired position of the front edge of the topsheet with respect to the front edge of the web in the laminating roll. In a fifth step, a position of the rear edge of the topsheet in the positioning roll is detected. In a sixth step, the cutting blade is actuated on the basis of the detected position of the rear edge of the topsheet. This allows the web to be cut and yields a rear edge of the cut-to-length web that is in a desired position with respect to the rear edge of the topsheet.

However, with such a method, the topsheets reach the positioning roll and then the laminating roll in a position that may prove inappropriate. This is because the sheets, the central longitudinal axis of which is not aligned with the central longitudinal axis of the laminating machine, will undergo only a longitudinal correction through a slowing or accelerating of the positioning roll. These misaligned sheets are bonded onto the single-face corrugated web with an offset, and this is undesirable in terms of the quality of the multi-layer composite that is supposed to be obtained.

Further, with such a method, the front edge and rear edge of the topsheet are identified incorrectly, these not being perpendicular to the central longitudinal axis of the laminating machine. This pivoting of the sheet with respect to the transverse direction means that the actuation of the cutting blade will not be synchronized with the detection of the rear edge. This leads to incorrect lengths when cutting the corrugated web.

The higher the speed of the laminating machine, the higher the percentage of misaligned sheets at the laminating roll because of the fast pace at which the topsheets taken from the pile by the feeder arrive.

Document FR-2,857,655 discloses a method and a device for aligning a material in sheet form passing through a machine that works it. In a first step, a sheet is brought onto a table, being taken from a layer or a series of sheets. In a second step, the sheet is conveyed into the vicinity of a conveying member that has two independent drive members. In a third step, a lateral and angular position of this sheet is detected, and in a fourth step, the independent drive members of the conveying member are actuated differentially as the sheet moves, in order to correct the lateral and angular errors in the positioning of this sheet.

Because of the independent drives of the members, the sheets progress from a first pivoted position into a second pivoted position and so on, until an aligned position is reached. However, such successive angular corrections demand that the sheet be moved longitudinally over a long length. The corrections are incomplete and are therefore imprecise with sheets of small sizes, the latter arriving in quick succession one after another. Conversely, the corrections are incomplete and therefore imprecise for sheets of larger dimensions because of the larger angles of pivoting to be corrected and because of the inertia of the sheets that has to be overcome.

In addition, these corrections through successive angular movements take time and are therefore incompatible with an increase in overall production rates. The sheets have a particularly smooth surface and are not effectively corrected by these successive angular adjustments.

SUMMARY OF THE INVENTION

It is a main objective of the present invention to develop a method for manufacturing a multi-layer composite by laminating a sheet-like element onto a backing. A second objective is to develop a laminating method in which a position of the sheet-like elements is adjusted precisely and rapidly. A third objective is to produce an arrangement that allows a positional offset of the sheet-like elements to be corrected without entailing a stoppage phase for subsequent lamination. A fourth objective is to provide a positioning arrangement for a laminating unit that avoids the problems of the prior art. Yet another objective is to create a laminating unit that has an arrangement that operates at high speed and that allows a positioning and correction of the sheets.

According to one aspect of the present invention, a method is developed for manufacturing a multi-layer composite by laminating a sheet-like element onto a backing in a laminating unit. The method comprises, in this order, the following successive steps:
 a step of conveying the sheet-like element in a longitudinal direction,
 a step of conveying the backing in the longitudinal direction,
 a step of detecting a position of this sheet-like element,
 a step of correcting the position of this sheet-like element on the basis of the position detected during the detection step and on the basis of a reference position, and
 a step of bonding this sheet-like element onto the backing.

In this method, the detection step comprises the following phases:
 a phase of measuring a lateral position of the sheet-like element,
 a phase of measuring an angle of pivoting of this sheet-like element, and
 a phase of measuring a longitudinal position of this sheet-like element.

In this method, the step of correcting the position of this sheet-like element notably comprises further the following steps:
 a phase of moving the sheet-like element laterally,
 a phase of pivoting this sheet-like element, and
 a phase of moving this sheet-like element longitudinally.

In other words, with the method, the various measurement phases are separate. The various phases of moving and pivoting are designed to cover all possible movements for a sheet-like element moving in a plane as far as the laminating step. The method is implemented without any stop or abutment of the sheet-like-elements and backings.

In another aspect of the invention, an arrangement for positioning sheet-like elements on backings to manufacture a multi-layer composite in a laminating unit, comprises:
 detection means for detecting a position of the sheet-like element, and
 conveying and correction means for conveying and of correcting the position of this sheet-like element, on the basis of the position detected by the detection means and on the basis of a reference position.

The conveying and correction means comprises:
 means for moving this sheet-like element laterally, and
 means for pivoting this sheet-like element and for moving it longitudinally, which means is secured to the lateral-movement means so as to perform a lateral correction, an angle-of-pivoting correction, and a longitudinal correction.

In other words, an additional lateral-movement means is added to the means that performs pivoting and longitudinal movement. All ranges of distances for the incorrect position of the sheet-like element are covered and can be corrected. The pivoting and longitudinal-movement means moves laterally. In addition, with the positioning arrangement, the function of lateral movement, the function of pivoting and the function of longitudinal movement are separate and controlled independently. These same functions can be used alone or in combination with one another.

According to yet another aspect of the invention, a laminating unit comprises a section for feeding the sheet-like elements, a section for feeding the backings, a section for laminating the sheet-like elements onto the backings, and an arrangement for positioning the sheet-like elements that has one or more of the technical features described and claimed hereinbelow.

The upstream and downstream directions are defined with reference to the direction in which the sheet-like elements and the backings travel in the longitudinal direction through the arrangement for positioning sheet-like elements and through the laminating unit. The longitudinal direction is defined with reference to the direction in which the sheet-like elements and the backings travel through the arrangement for positioning sheet-like elements and through the laminating unit along their central longitudinal axis. The transverse or lateral direction is defined as being the direction perpendicular to the direction of travel of the sheet-like elements and of the backings in the plane formed by such sheet-like elements and backings respectively.

BRIEF DESCRIPTION OF THE DRAWINGS

The invention will be clearly understood and its various advantages and features will become better apparent from the following description of the non-limiting exemplary embodiment given with reference to the attached schematic drawings in which:
FIGS. 2 to 7 depict the various steps in the method for manufacturing a multi-layer composite by laminating according to the invention.

DETAILED DESCRIPTION OF THE PREFERRED EMBODIMENTS

Figure 1:
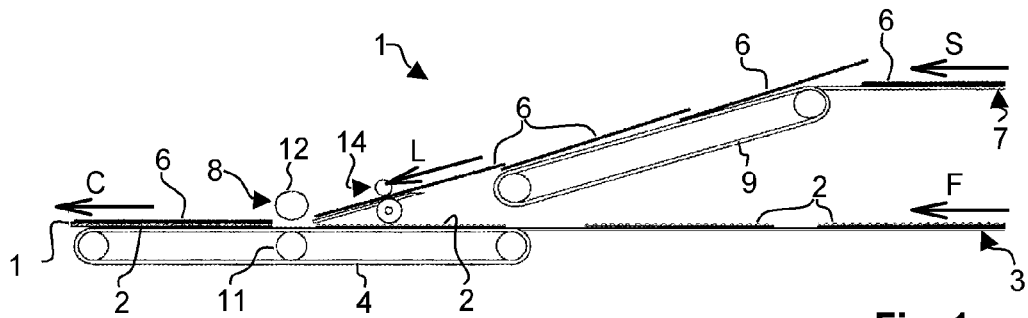
FIG. 1 depicts a simplified partial side view of a laminating unit.

As shown in FIG. 1, a machine for producing a multi-layer composite comprises a laminating unit (1). The unit (1) can be arranged for instance at the exit of a corrugating machine (not shown) that produce a single-face corrugated web. The unit (1) can also be fed by an unwinder (not shown), if the single-face corrugated web comes from a reel. The single-face corrugated web is then cut into a cutting section (not shown) to produce individual backings (2). The unit (1) can also comprise a feed section (not shown) for the individual backings (2). The feed section is for example, in the form of a board feeder, the individual backings (2) being initially arranged in a pile. This type of assembly is known as being a sheet-to-sheet laminator.

The backings (2) are supplied continuously from the longitudinal upstream direction downstream (Arrow F) by a first conveying section (3), for example in the form of a first endless belt. At this stage, the unit (1) comprises an adhesive-coating or gluing section (not depicted), in which glue is applied to the upper face of the backings (2).

At the downstream exit of the first conveying section (3), the backing (2) is conveyed in the longitudinal direction (F) by a second conveying section (4), for example in the form of a second endless belt.

By virtue of the unit (1), sheet-like elements for instance in the form of individual printed sheets (6), are laminated onto the backings (2). The unit (1) in its upper upstream part can comprise a feed section (not depicted) for the elements (6). The feed section is, for example, in the form of a sheet feeder, the elements being initially arranged in a pile.

The feed section causes the elements (6) to overlap one another and thus bring them into a continuous layer of shingled elements (6). The shingled element stream is conveyed in the longitudinal direction (Arrow S) with a third conveying section (7), for example in the form of an endless belt.

The unit (1) next comprises a laminating section (8) positioned, on the one hand, in the second conveying section (4) and, on the other hand, downstream of the third conveying section (7). A convergence line for lamination for bonding the backing (2) to the element (6) is situated between a bottom laminating roll (11) and a top laminating roll (12).

The backing (2) reaches the convergence line thanks to the second conveying section (4). The element (6) reaches the convergence line thanks to an extension (9) of the third conveying section (7).

The element (6) is positioned and bonded onto the glue-coated backing (2). A multi-layer composite (13) is thus formed thanks to the rotating of the laminating rolls (11 and 12) as the backing (2) and the element (6) simultaneously advance. The composite (13) leaves the unit (1) downstream (Arrow C). The composite (13) has an upper face consisting of the element (6) and an under face consisting of the backing (2).

The unit (1) comprises an arrangement (14) for positioning the element (6) very precisely on the backing (2). The arrangement (14) is installed downstream of the third conveying section (7) and its extension (9) and upstream of the laminating section (8). The arrangement (14) is used to correct the position of the element (6) and laminate it between the two laminating rolls (11 and 12).

A laminating method is performed by the unit (1) and comprises several steps, illustrated in FIGS. 2 to 7. The element (6) has been deliberately depicted at a significant angle of pivoting that has to be corrected prior to lamination and in order to obtain a quality composite (13). The final adjusted position (15) of the element (6) corresponding to a reference position is partially represented.

In a first conveying step (FIG. 2), the element (6) is conveyed in the longitudinal direction (Arrow L) toward the laminating section (8). The element (6) is conveyed using the extension (9).

In a second detecting step (FIGS. 3 to 5), the position of the element (6) is detected. According to the method of the invention, the detection step comprises three phases of measurements. In a first phase (see FIG. 3), the lateral position of the element (6) is measured. In a second phase (see FIGS. 4 and 5), the angle of pivoting of the element (6) is measured. In a third phase (see FIGS. 4 and 5), the longitudinal position of the element (6) is measured.

In a third correcting step (FIGS. 6 and 7), the position of the element (6) is corrected. The correction is done by calculation, on the basis of the position detected during the second detection step, with the first, second and third phases of measurements, and on the basis of the reference position (15).

In a first example, the reference position (15) has been determined beforehand by the operator of the machine and corresponds to the position that yields composites (13) of the best quality. The positioning of the elements (6) is programmable by the operator. The reference position (15) can be recorded.

In a second example, the reference position (15) is determined a being a function of the position of the backing (2) that advance being moved by the first and second conveying sections (3 and 4). The laminating method thus comprises another step positioned after the step of conveying the backing (2) in the longitudinal direction and before the step of correcting the position of the element (6). This additional step consists in detecting a position of the backing (2) and in calculating the reference position (15) according to the detected position of the backing (2).

The phases of measuring the position of the element (6) in this second step and the phases of correcting the position of this element (6) in this third step can be combined for greater speed and efficiency of correction. By way of an advantageous embodiment, the method may comprise accordingly the following successive phases positioned after the first conveying step.

In a first phase (see FIG. 3), the lateral position of the element (6) is measured. In this phase, the lateral edge (16) of the element (6) is detected. In a second phase, the element (6) is moved laterally (Arrow T in FIGS. 3 to 7). By way of preferred example, the lateral movement of the element (6) begins after the phase of measuring (FIG. 3) the lateral position of the element (6). In a third phase (see FIGS. 4 and 5), the longitudinal position and the angle of pivoting of the element (6) are measured and/or calculated. In this phase, the front edge (17) of the element (6) is detected. In the preferred example, the lateral movement (T) may stop at the end of this third phase (FIG. 5). In a fourth phase (see FIG. 6), the element (6) is pivoted (Arrow P in FIG. 6). In a fifth phase, the element (6) is moved longitudinally (Arrow L in FIG. 7). The longitudinal movement (L) of the element (6) may take place throughout the correction step. In another example, the lateral movement (T) may stop at the moment when the element (6) reaches the convergence line in the laminating section (16).

The detection step consists in reading one or more edges (16 and 17) of the element (6) and/or of the backing (2) in lateral or longitudinal direction or also printed marks in lateral or longitudinal direction. A lateral mark or a front mark respectively printed on the surface of the element (6) and/or of the backing (2) can be detected. The detection of edges or marks depends on the type of detector used and on the register with printings desired.

In a fourth and final step (FIG. 7), the element (6) is bonded onto the backing (2) with a gluing in the position sought by the operator.

The method may preferably further comprise a step of accelerating the element (6) during the phases of pivoting (P) and longitudinally moving (L) the element (6) so as to be able to progress this element (6) from a conveying speed to a laminating speed. The laminating speed is higher than the conveying speed.

The difference in speed is made up by accelerating the element (6). In addition, this acceleration allows the element (6) that is in the course of undergoing the correction step to be separated from the upstream element following it that is still in the layer. This acceleration may also be of use in order to be able to create a gap between the first element (6) situated downstream and the next element (6) situated upstream. This gap then serves properly to separate the rear edge of the element (6) situated downstream from the front edge (17) of the next element (6) situated upstream. The front edge (17) can thus be clearly detected, making it possible to measure the longitudinal position and angle of pivoting of the element (6).

The method may beneficially comprise a phase of holding the element (6) with a clamping, this phase being positioned before the conveying step, so as to allow all the lateral (T) and longitudinal (L) movements and all the pivoting (P) of the element (6). The method may advantageously comprise a phase of releasing the element (6), this phase being positioned after the start of the bonding step.

For preference, the method may comprise a step of accelerating and of decelerating the backing (2) so as to be able to create a gap between the backing (2) situated downstream and the backing (2) situated upstream. Accelerating makes it possible for the backing (2) situated downstream to be extracted more swiftly and prevent it from being packed together with the next backing (2) situated upstream. The acceleration is managed by the second conveying section (4).

The arrangement (14) that corrects the position of the element (6) first of all comprises means for detecting the position of the element (6). The detection means comprise a lateral detector (18). The lateral detector (18) detects the arrival of the lateral edge (16) of the element (6). The lateral detector (18) detects also the arrival of the mark printed laterally on the surface of the element (6). The detection means (2) additionally comprise two frontal detectors (19). These frontal detectors (19) detect the arrival of the front edge (17) of the element (6). The frontal detectors (19) detect also the arrival of the mark printed at the front on the surface of the element (6).

The arrangement (14) that corrects the position of the element (6) may comprise means for detecting the position of the backing (2) with a detector (not shown). The detector detects the arrival of the front edge of the backing (2). The detector detects also the arrival of a mark printed at the front on the under face of the backing (2).

The arrangement (14) comprises means (21) for conveying and correcting the position of this element (6) on the basis of the position detected by the detection means (18 and 19) and on the basis of a reference position (15). The arrangement (14) with its conveying and correcting means (21) is mounted transversely with respect to the longitudinal direction of travel of the elements (6).

Figure 8:
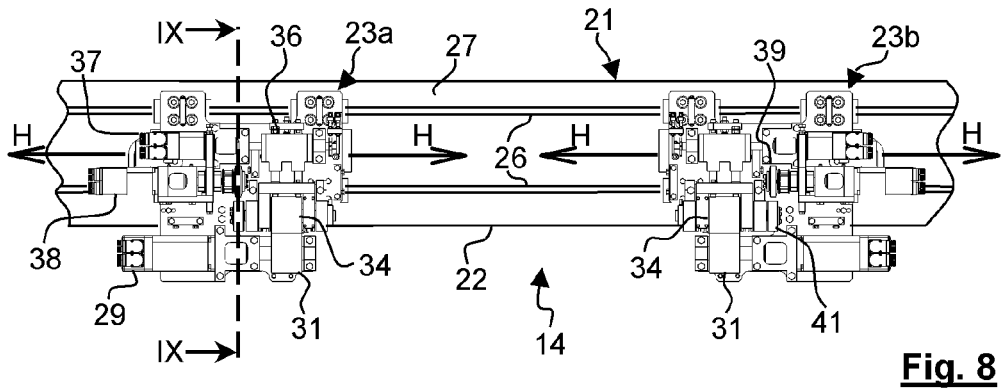
FIG. 8 depicts a transverse view of a positioning arrangement according to the invention.
Figure 9:
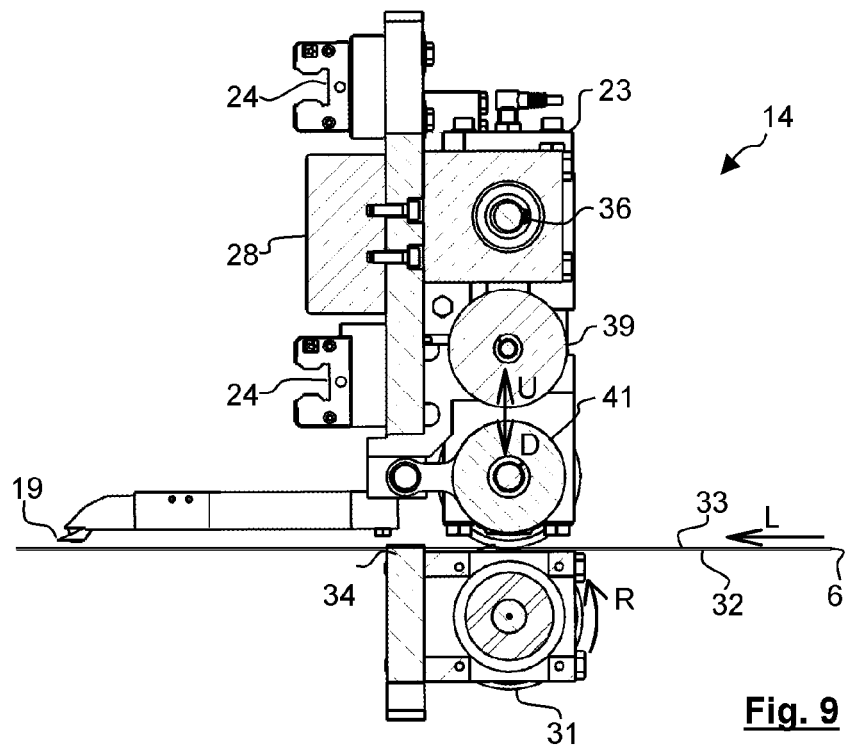
FIG. 9 depicts a view in section of a head of the arrangement, the section being taken on the plane IX-IX of FIG. 8.

According to the invention and as shown by FIGS. 8 and 9, the conveying and correcting means (21) of the arrangement (14) comprise means (22) for the lateral movement of this element (6). The lateral-movement means (22) effects a lateral correction (T) on the element (6).

The conveying and correcting means (21) also comprise means (23) for the pivoting and longitudinal movement of this element (6). The pivoting and longitudinal movement means (23) effects a correction to the angle of pivoting (P) and a longitudinal correction (L) on the element (6). The pivoting and longitudinal-movement means (23) is secured to the lateral-movement means (22). Because of the way in which it is mounted, the pivoting and longitudinal-movement means (23) moves laterally with respect to the lateral-movement means (22).

Beneficially, the pivoting and longitudinal-movement means (23) may comprise two independent heads (23a and 23b) able to drive the element (6). The heads (23a and 23b) are mounted so that they can slide transversely with respect to the direction of travel of the element (6). The heads (23a and 23b) slide laterally and independently (see Arrows H in FIG. 8) on the lateral-movement means (22).

The heads (23a and 23b) comprise sliders in the form of guides (24) mounted on the downstream side. The guides (24) engage with corresponding slides (26) mounted on a cross member (27).

The lateral-movement means (22) may beneficially comprise a linear motor, on which the means (23) for pivoting and for longitudinal movement with the two heads (23a and 23b) may be mounted. The heads (23a and 23b) comprise the primary drive assembly (28), mounted on the downstream side. The cross member (27) incorporates the secondary assembly, known as the magnet track or magnetic track.

The lateral-movement means (22) is also used for positioning the two heads (23a and 23b) in order to adjust the format of the element (6).

The heads (23a and 23b) may each incorporate a first motor (29) able to collaborate with a bottom drive roller (31) in contact with an under face (32) of the element (6). Through a differential control (see document FR-2,857,655) of the two first motors (29) of the two heads (23a and 23b), the two bottom rollers (31) rotates (Arrow R in FIG. 9) and drive the element (6) in the longitudinal movement (L) and/or pivoting movement (P). The two first motors (29) also generate all the accelerations required for the element (6).

The phases of correcting the position are performed by virtue of the differential driving of the first motors (29) for performing the phases of pivoting and of moving longitudinally the element (6), and of the linear motor (22) for performing the phase of moving the element laterally.

The drive roller (31) may act in conjunction with a pressing device in contact with a top face (33) of this element (6). The pressing device comprises a top roller (34). The element (6) is caught and held between the bottom drive roller (31) and the top roller (34).

Each head (23a and 23b) may comprise a lifting device (36) able to cause the top roller (34) of the pressing device to switch from a position in which the element (6) is released into a position in which it presses on and holds or clamps this element (6) and vice versa from a position in which it holds the element (6) into a position in which the element (6) is released. The lifting device (36) here is in the form of an eccentric actuated by a second motor (37).

The front edge (17) of the element (6) reaches the arrangement (14) by being driven by the extension (9) of the third conveying section (7). Here, the second motor (37) is actuated and the top roller (34) of the pressing device go down to hold the element (6) (Arrow D in FIG. 9). The element (6) is then driven by the bottom drive roller (31) and the first motor (29).

When the front edge (17) of the element (6) enters through the laminating section (8), the second motor (37) is actuated, the top roller (34) of the pressing device is raised back up (Arrow U in FIG. 9) and the top roller (34) releases consequently the element (6).

For preference, each head (23a and 23b) may comprise a deceleration device possibly able to cause the pressing device with its top roller (34) to progress from a rapid bonding speed to a slower conveying speed. The deceleration device comprises a third motor (38) driving a friction roller (39). The friction roller (39) is able to rub against a friction wheel (41), the latter being axially linked to the top roller (34).

When the element (6) is to be released, the pressing device causes the upper roller (34) to raise back up (U), the top roller (34) and the friction wheel (41) become loose, the friction wheel (41) engages the friction roller (39), the third motor (38) is thus actuated, and the friction wheel (41) and the friction roller (39) are decelerated.

The present invention is not restricted to the embodiments described and illustrated. Numerous modifications may be made without thereby departing from the context defined by the scope of the set of claims.

The invention claimed is:

1. A laminating method for manufacturing a multi-layer composite in a laminating unit comprising, in this order, the steps of:
   conveying a sheet element in a longitudinal direction in the laminating unit toward a laminating section,
   conveying a backing in the longitudinal direction in the laminating unit toward a laminating section,
   detecting a position of the sheet element comprising phases of measuring a lateral position, an angle of pivoting, and a longitudinal position of the sheet element with reference to at least one of the longitudinal direction and the laminating unit,
   correcting the position of the sheet element on a first basis of the detected position and on a second basis of a reference position, the correcting step comprising the phases of lateral movement, pivoting movement, and longitudinal movement of said sheet element, and
   bonding the sheet element onto the backing by laminating the sheet element onto the backing in the laminating unit,
   wherein the reference position is related to the position of the backing, and wherein the sheet element and the backing are discrete bodies.

2. The method according to claim 1, further comprising performing successive phases between the conveying step and the bonding step:
   the detecting is by measuring the lateral position of the element and then moving the element laterally responsive to the detected and reference positions,
   the detecting is by measuring the longitudinal position of the element with reference to the laminating unit and then moving the element longitudinally responsive to the detected and reference position, and the detecting is further by measuring the angle of pivoting of the element and then pivoting the element responsive to the detected and reference positions.

3. The method according to claim 1, further comprising a step of accelerating the element, during the phases of pivoting and longitudinal movement of the element to cause the element to accelerate from a conveying speed to a bonding speed higher than the conveying speed.

4. The method according to claim 1, further comprising a step of holding the element, positioned before the conveying step, and a step of releasing the element positioned after the start of the bonding step.

5. The method according to claim 1, wherein the backing comprises separate backing elements, each for having a respective one of the elements laminated to it; the method further comprising a step of accelerating and of decelerating the backing element, so as to create a gap between each backing element upstream and a next backing element downstream in the longitudinal direction.

6. The method according to claim 1, further comprising a step of detecting a position of the backing, and calculating the reference position according to the detected position of the backing, this step being performed after the step of conveying the backing in the longitudinal direction and before the step of correcting the position of the element.

7. The method according to claim 1, wherein the detection step comprises reading one or more edges of the element or printed marks on the element, each in lateral or longitudinal direction.

8. The method according to claim 6, wherein the detection step comprises reading one or more edges of the backing or printed marks on the backing, each in lateral or longitudinal direction.

9. The method according to claim 2, further comprising a step of holding the element, positioned before the conveying step, and a step of releasing the element positioned after the start of the bonding step.

10. A laminating method for manufacturing a multi-layer composite in a laminating unit comprising, in this order, the steps of:
    conveying a sheet element in a longitudinal direction in the laminating unit,
    conveying a backing in the longitudinal direction in the laminating unit,
    detecting a position of the sheet element comprising phases of measuring a lateral position, an angle of pivoting, and a longitudinal position of the sheet element with reference to at least one of the longitudinal direction and the laminating unit,
    correcting the position of the sheet element on a first basis of the detected position and on a second basis of a reference position, the correcting step comprising the phases of lateral movement, pivoting movement, and longitudinal movement of said sheet element,
    bonding the sheet element onto the backing by laminating the sheet element onto the backing in the laminating unit, and
    detecting a position of the backing, and calculating the reference position according to the detected position of the backing, this step being performed after the step of conveying the backing in the longitudinal direction and before the step of correcting the position of the element and
    wherein the sheet element and the backing are discrete bodies.

11. The method according to claim 10, wherein the detection step comprises reading one or more edges of the backing or printed marks on the backing, each in lateral or longitudinal direction.

12. The method according to claim 1, wherein the position of the sheet element is corrected based on a reference position related to the position of a discrete body.

* * * * *